United States Patent
Lv et al.

(10) Patent No.: US 10,671,755 B2
(45) Date of Patent: Jun. 2, 2020

(54) METHOD AND DEVICE FOR CONCEALING USER INFORMATION CONTAINED IN APPLICATION

(71) Applicant: Alibaba Group Holding Limited, George Town (KY)

(72) Inventors: Chenchen Lv, Hangzhou (CN); Weigang Guan, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/137,424

(22) Filed: Sep. 20, 2018

(65) Prior Publication Data

US 2019/0026235 A1 Jan. 24, 2019

Related U.S. Application Data

(63) Continuation of application No. PCT/CN2017/077279, filed on Mar. 20, 2017.

(30) Foreign Application Priority Data

Mar. 29, 2016 (CN) .......................... 2016 1 0188604

(51) Int. Cl.
*G06F 21/62* (2013.01)
*G06F 12/14* (2006.01)
*G06F 21/10* (2013.01)

(52) U.S. Cl.
CPC ...... *G06F 21/6245* (2013.01); *G06F 12/1408* (2013.01); *G06F 21/105* (2013.01);
(Continued)

(58) Field of Classification Search
CPC .... G06F 21/105; G06F 21/6245; G06F 21/62; G06F 2212/1052; G06F 2212/0768; G06F 2212/2107; G06Q 30/0269
See application file for complete search history.

(56) References Cited

U.S. PATENT DOCUMENTS

| 6,281,893 B1 | 8/2001 | Goldstein |
| 8,073,840 B2 | 12/2011 | Smith et al. |

(Continued)

FOREIGN PATENT DOCUMENTS

| CA | 2178753 | 6/2000 |
| CN | 1746864 | 3/2006 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Sher A Khan
(74) *Attorney, Agent, or Firm* — Fish & Richardson P.C.

(57) ABSTRACT

Techniques are described for concealing sensitive or confidential information in an application. In an example method, operation rights are obtained to an attribute list of a media file associated with a software application. Then, the attribute list of the media file is identified. Further, user information generated by the software application is written into the attribute list of the media file. Lastly, the media is stored in an installation path of the software application.

14 Claims, 4 Drawing Sheets

(52) U.S. Cl.
CPC .............. *G06F 2212/1052* (2013.01); *G06F 2221/0768* (2013.01); *G06F 2221/2107* (2013.01)

(56) References Cited

U.S. PATENT DOCUMENTS

| | | | | |
|---|---|---|---|---|
| 9,100,440 | B1* | 8/2015 | Manmohan | H04L 63/20 |
| 9,589,150 | B2* | 3/2017 | Li | G06F 21/6245 |
| 9,760,697 | B1* | 9/2017 | Walker | G06F 21/31 |
| 9,928,373 | B2* | 3/2018 | Sarin | G06F 21/6209 |
| 10,102,396 | B2 | 10/2018 | Yoshimuta et al. | |
| 2002/0112083 | A1* | 8/2002 | Joshi | G06F 21/62 |
| | | | | 709/248 |
| 2005/0021520 | A1* | 1/2005 | Neilsen | G06F 21/31 |
| 2007/0198546 | A1* | 8/2007 | Shintani | G06T 1/00 |
| 2007/0204078 | A1* | 8/2007 | Boccon-Gibod | G06F 21/10 |
| | | | | 710/54 |
| 2008/0052641 | A1* | 2/2008 | Brown | G06F 21/62 |
| | | | | 715/811 |
| 2008/0288788 | A1* | 11/2008 | Krig | G06F 21/10 |
| | | | | 713/193 |
| 2011/0040983 | A1* | 2/2011 | Grzymala-Busse | |
| | | | | G06F 21/6245 |
| | | | | 713/189 |
| 2014/0114966 | A1* | 4/2014 | Bilinski | H04L 51/10 |
| | | | | 707/723 |
| 2014/0282755 | A1* | 9/2014 | Alsina | H04N 21/6587 |
| | | | | 725/88 |
| 2014/0372768 | A1* | 12/2014 | Zielinski | G06F 21/602 |
| | | | | 713/189 |
| 2015/0371057 | A1* | 12/2015 | Ow | H04L 63/10 |
| | | | | 726/28 |
| 2016/0055342 | A1* | 2/2016 | Bivona | G06F 21/62 |
| | | | | 726/26 |

FOREIGN PATENT DOCUMENTS

| | | | |
|---|---|---|---|
| CN | 101114256 | | 1/2008 |
| CN | 101114256 A | * | 1/2008 |
| CN | 104199909 | | 12/2014 |
| CN | 104200171 | | 12/2014 |
| CN | 104200171 B | * | 7/2017 |
| JP | H10124290 | | 5/1998 |
| JP | 2003202930 | | 7/2003 |
| JP | 2005182747 | | 7/2005 |
| JP | 2009211384 | | 9/2009 |
| JP | 2010052998 | | 3/2010 |
| JP | 2011048739 | | 3/2011 |
| JP | 2011524587 | | 9/2011 |
| JP | 2014503865 | | 2/2014 |
| JP | 2014078103 | | 5/2014 |
| JP | 2014120016 | | 6/2014 |
| TW | 200731751 | | 8/2007 |
| WO | WO 2015045048 | | 4/2015 |

OTHER PUBLICATIONS

Nakamoto, "Bitcoin: A Peer-to-Peer Electronic Cash System," www.bitcoin.org, 2005, 9 pages.

International Search Report by the International Searching Authority issued in International Application No. PCT/CN2017/077279 dated Jun. 30, 2017; 8 pages.

International Preliminary Report on Patentability in International Application No. PCT/CN2017/077279, dated Oct. 2, 2018, 10 pages (with English Translation).

* cited by examiner

METHOD AND DEVICE FOR CONCEALING USER INFORMATION CONTAINED IN APPLICATION

CROSS-REFERENCE TO RELATED APPLICATIONS

This application is a continuation of PCT Application No. PCT/CN2017/077279, filed on Mar. 20, 2017, which claims priority to Chinese Patent Application No. 201610188604.2, filed on Mar. 29, 2016, and each application is hereby incorporated by reference in its entirety.

TECHNICAL FIELD

The present application relates to the field of terminal technologies, and in particular, to a method and a device for concealing user information contained in an application.

BACKGROUND

With the rapid development of various wireless mobile devices and the mobile Internet, more and more wireless mobile devices are used in people's daily life, and many wireless mobile devices have become a part of life. Currently, regardless of the iOS, Android, or Windows system, the speed, convenience, stability, and security of data propagation are important indicators for measuring a wireless mobile device. In particular, when it relates to important private user information, the security indicator becomes more important.

An application used in a wireless mobile device can implement various life and work functions such as shopping, chatting, making friends, and traveling. It is greatly helpful to a user. When using the application, it generates various data, such as a login account and a login password for the application, and a historical chat record, shopping order information, payment information, etc., that relate to sensitive and confidential user information. The user information is usually stored in a local folder of the mobile device in a form of a text file and a database file. Therefore, the text file mentioned above and the database file are easily found, and consequently, the user information is likely to be disclosed. To avoid likely disclosure of user information, sensitive and confidential user information generated in the running application are encrypted before being stored in the local folder of the mobile device. However, although the information has been encrypted, the encrypted information ciphertext string is still completely exposed. For example, a text file and a database file (such as a .txt, .db, or .plist file) can be found by using a relatively common third-party tool (a database tool such as iTools and Peapod), to obtain the encrypted information. As such, the probability of cracking the encrypted information to obtain sensitive and confidential information is increased, the sensitive and confidential user information is then disclosed, and the security level is relatively low.

SUMMARY

Implementations of the present application provide a method and a device for concealing user information contained in an application, to resolve an existing-technology problem that user information generated in an application running process is easily discovered and obtained and consequently user information is disclosed.

An implementation of the present application provides a method for concealing user information contained in an application, and the method includes the following: obtaining operation rights to an attribute list of a media file in an application; reading the attribute list of the media file in the application and writing user information generated in the application into the attribute list of the media file; and re-saving the media file.

Further, the user information includes sensitive or confidential information.

Further, obtaining operation rights to an attribute list of a media file in an application includes the following: obtaining a file handle of the media file in the application; and obtaining read/write permission for the attribute list of the media file in the application by using the file handle of the media file.

Further, writing user information generated in the application into the attribute list of the media file includes the following: writing the user information generated in the application into the attribute list of the media file in a form of a key-value pair.

Further, the media file includes a photo file, an audio file, and a video file.

Further, the user information is encrypted user information.

An implementation of the present application further provides a method for concealing user information contained in an application, and the method includes the following: obtaining operation rights to an attribute list of a media file in an application; performing logic processing on user information generated in the application; reading the attribute list of the media file in the application and writing user information that undergoes logic processing in the application into the attribute list of the media file; and re-saving the media file.

Further, the user information includes sensitive or confidential information.

Further, obtaining operation rights to an attribute list of a media file in an application includes the following: obtaining a file handle of the media file in the application; and obtaining read/write permission for the attribute list of the media file in the application by using the file handle of the media file.

Further, writing user information generated in the application into the attribute list of the media file includes the following: writing the user information generated in the application into the attribute list of the media file in a form of a key-value pair.

Further, the media file includes a photo file, an audio file, and a video file.

Further, the user information is encrypted user information.

Further, performing logic processing on user information generated in the application includes the following: performing reversible logic processing on the user information generated in the application.

Further, performing logic processing on user information generated in the application includes the following: performing symmetric encryption processing on the user information generated in the application by using a symmetric encryption algorithm.

An implementation of the present application further provides a device for concealing user information contained in an application, and the device includes the following: an acquisition module, configured to obtain operation rights to an attribute list of a media file in an application; a read/write module, configured to read the attribute list of the media file in the application and write user information generated in the application into the attribute list of the media file; and a saving module, configured to re-save the media file.

Further, the device further includes the following: a logic processing module, configured to perform logic processing on the user information generated in the application.

In comparison with the existing technology, according to the method and the device for concealing user information contained in an application provided in the implementations of the present application, the user information generated in the application is written into the attribute list of the media file in the application. As such, the user information is concealed and can hardly be found and obtained in a local folder of a mobile device, and the user information generated in the application is prevented from being disclosed.

BRIEF DESCRIPTION OF DRAWINGS

The accompanying drawings described here are intended to provide a further understanding of the present application, and constitute a part of the present application. The illustrative implementations of the present application and descriptions of the implementations are intended to describe the present application, and do not constitute limitations on the present application. In the accompanying drawings.

DESCRIPTION OF EMBODIMENTS

To make the objectives, technical solutions, and advantages of the present application clearer, the following describes the technical solutions of the present application with reference to specific implementations of the present application and corresponding accompanying drawings. Apparently, the described implementations are merely some rather than all of the implementations of the present application. Other implementations obtained by a person of ordinary skill in the art based on the implementations of the present application without creative efforts shall fall within the protection scope of the present application.

Figure 1:
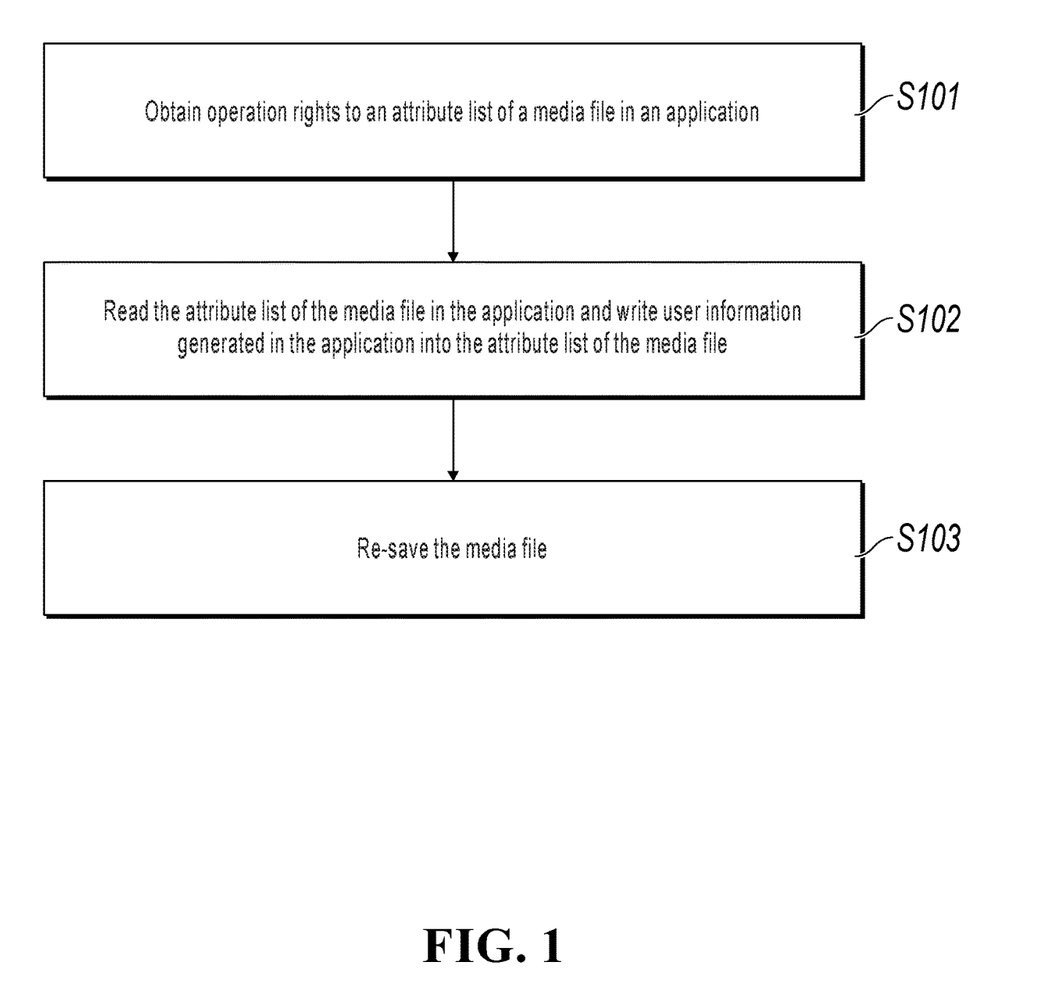
FIG. 1 is a schematic flowchart illustrating a method for concealing user information contained in an application, according to Implementation 1 of the present application.

FIG. 1 is a schematic flowchart illustrating a method for concealing user information contained in an application, according to an implementation of the present application. The following describes in detail the method for concealing user information contained in an application provided in the present implementation of the present application with reference to FIG. 1. As shown in FIG. 1, the method for concealing user information contained in an application provided in the present implementation of the present application includes the following steps.

Step S101: Obtain operation rights to an attribute list of a media file in an application.

In the present implementation of the present application, in a running process, an application of a mobile device generates user information corresponding to a user operation. The user information includes sensitive and confidential user information, and the user information is automatically stored in the mobile device. The previous application can be various applications that are installed on the mobile device, for example, an application for payment or for making friends. A payment application is used as an example. When the user uses the payment application, the application generates sensitive and confidential user information such as a login account, a login password, an ID card number, a mobile number, a bank card number, and a payment password. In such user information, the login password and the payment password are confidential user information, and the login account, the ID card number, the mobile number, and the bank card number are sensitive information.

Further, in application running processes, different service types or application scenarios correspond to different user information. Continuing with the example of the payment application, in a payment application scenario, sensitive and confidential user information related to payment is generated. In addition, user information related to chat information is generated in a chat application scenario.

In the present step, the media file in the application can be located in an installation directory of the application, and can be used as a carrier to store the previous user information. Different types of user information can be stored in different media files. Further, the previous user information can be stored in the attribute list of the media file, and the attribute list includes attribute information used to describe the media file. The previous media file can be any one of a picture file, an audio file, and a video file. Preferably, the previous media file can be a picture file. The previous media file can be pre-packaged into an application installation package as a part of an application icon, and after the application is installed, the previous media file is located in an installation directory of the application.

The user can move a mouse pointer to the media file, click on the right mouse button, click on a media file attribute option, and then click on the detailed information to see an attribute list of the media file, including attribute identifiers and corresponding attribute values. For example, an attribute list of a photo includes attribute identifiers and attribute values corresponding to the attribute identifiers, such as a name, a project type, a creation date, and a modification date.

Further, obtaining operation rights to an attribute list of a media file in an application includes the following: obtaining a file handle of the media file in the application; and obtaining read/write permission for the attribute list of the media file in the application by using the file handle of the media file.

The file handle of the media file can also be referred to as an object pointer of the media file. A file handle is a unique integer value, namely, a 4-byte value (an 8-byte value in a 64-bit program) that is used to identify different objects in the application and different instances of the same type of object. The file handle of the media file is obtained, and the application can use the file handle to read information from or write information into the media file, that is, the attribute list of the media file.

Step S102: Read the attribute list of the media file in the application and write user information generated in the application into the attribute list of the media file.

In the present implementation, because the file handle of the media file is obtained, the attribute list of the media file can be used as an object that can be read or written. The attribute list of the media file includes the attribute information used to describe the media file.

The attribute list of the media file is read into a memory of the mobile device, and the previous user information is written in the memory of the mobile device into the attribute list of the media file.

Writing user information generated in the application into the attribute list of the media file includes the following: writing the user information generated in the application into the attribute list of the media file in a form of a key-value pair.

In an application running process, user information related to a user operation is generated, such as sensitive information and confidential information. The user information can be an unencrypted plaintext, and the user information can be directly written into the attribute list of the media file.

For example, in an application running process, an account password is generated, and is locally stored. To prevent the user's account password from being stolen, the account password can be written into an attribute list of a media file in a form of a key-value pair to conceal the account password. An attribute identifier Key corresponding to the account password can be named Password. An attribute value Value of the account password can be a string representing a password, and the string can be a plaintext. Certainly, to better conceal and disguise the account password, the attribute identifier Key corresponding to the account password can be set to an attribute identifier Key of a system type that is unlikely to be identified.

In addition, it is worthwhile to note that the user information related to the user operation and generated in the application can alternatively be an encrypted ciphertext. Encryption methods for user information include encryption algorithms such as MD5, DES, RSA, SM2, and SM3.

Further, user information generated in different application scenarios can be written into different media files. For example, user information (such as a payment password and order information) generated in an application payment scenario can be written into a media file, for example, into picture a, and user information generated in a chat application scenario (such as a phone number and a bank card number in chat information) can be written into another media file, for example, into picture b.

Step S103: Re-save the media file.

In the present implementation, after all user information that needs to be concealed is written into the attribute list of the media file, the previous media file is to be re-saved. The user can later move a mouse pointer to the media file, clicks on the right mouse button, clicks on a media file attribute option, and then clicks on the detailed information to see that the user information written into the attribute list has been stored in the attribute list of the media file.

If the media file is successfully saved, the media file is stored in an installation path of the application, and in such case, the user information is successfully disguised.

If the media file fails to be saved, the media file can be re-saved automatically at intervals of one predetermined time period (for example, three to five seconds), and the predetermined number of re-saving times can be three. If the media file is successfully saved during the three times of re-saving, it indicates that the user information is successfully disguised. If the media file fails to be saved, after being re-saved more than three times, such saving failure is saved into a failure queue.

When user information related to sensitive and confidential information is generated in the application again, after the user information is written into the media file and the media file is successfully saved, the failure queue is automatically invoked, and the media file is re-saved until the media file is saved successfully. If the file still fails to be saved, such task is added to a new failure queue, and the previous process is repeated until the media file is successfully saved.

Figure 2:
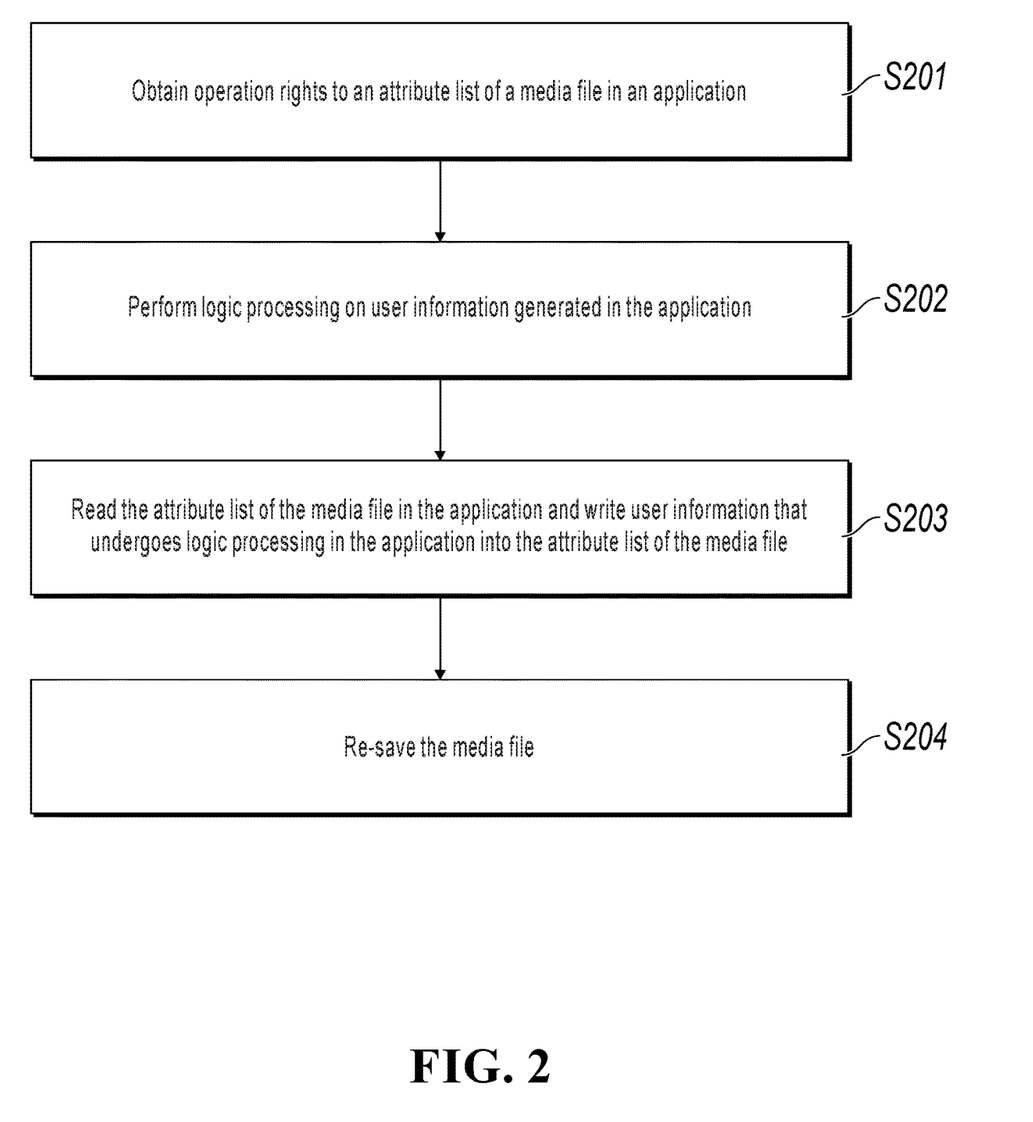
FIG. 2 is a schematic flowchart illustrating a method for concealing user information contained in an application, according to Implementation 2 of the present application.

FIG. 2 is a schematic flowchart illustrating a method for concealing user information contained in an application, according to Implementation 2 of the present application. The following describes in detail the method for concealing user information contained in an application provided in Implementation 2 of the present application with reference to FIG. 2. As shown in FIG. 2, the method for concealing user information contained in an application provided in Implementation 2 of the present application includes the following steps.

Step S201: Obtain operation rights to an attribute list of a media file in an application.

In the present implementation, the present step is basically the same as step S101 in the method for concealing user information contained in an application provided in Implementation 1 of the present application, and details are omitted here for simplicity.

Step S202: Perform logic processing on user information generated in the application.

In the present implementation, to avoid likely disclosure of the user information (such as sensitive and confidential user information) generated in the application, logic processing needs to be performed on the user information in the application in advance. It is worthwhile to note that the previous logic processing is reversible logic processing. To be specific, a logic processing process for user information is reversible.

Performing logic processing on user information generated in the application includes the following: performing symmetric encryption processing on the user information generated in the application by using a symmetric encryption algorithm.

Certainly, it is worthwhile to note that, before logic processing, the user information can also be encrypted by using an encryption algorithm such as MD5, DES, RSA, SM2, or SM3.

Step S203: Read the attribute list of the media file in the application and write user information that undergoes logic processing in the application into the attribute list of the media file.

It is worthwhile to note that, in the present implementation, the user information that undergoes logic processing can also be written into the attribute list of the media file in a form of a key-value pair to conceal the user information. For example, the user information is an account password, an attribute identifier Key corresponding to the account password can be named Password. An attribute value Value of the account password can be a string or a character string obtained after logic processing.

Step S204: Re-save the media file.

In the present implementation, after all user information that needs to be concealed is written into the attribute list of the media file, the previous media file is to be re-saved. The present step is basically the same as step S103 in the method for concealing user information contained in an application provided in Implementation 1 of the present application, and details are omitted here for simplicity.

Figure 3:
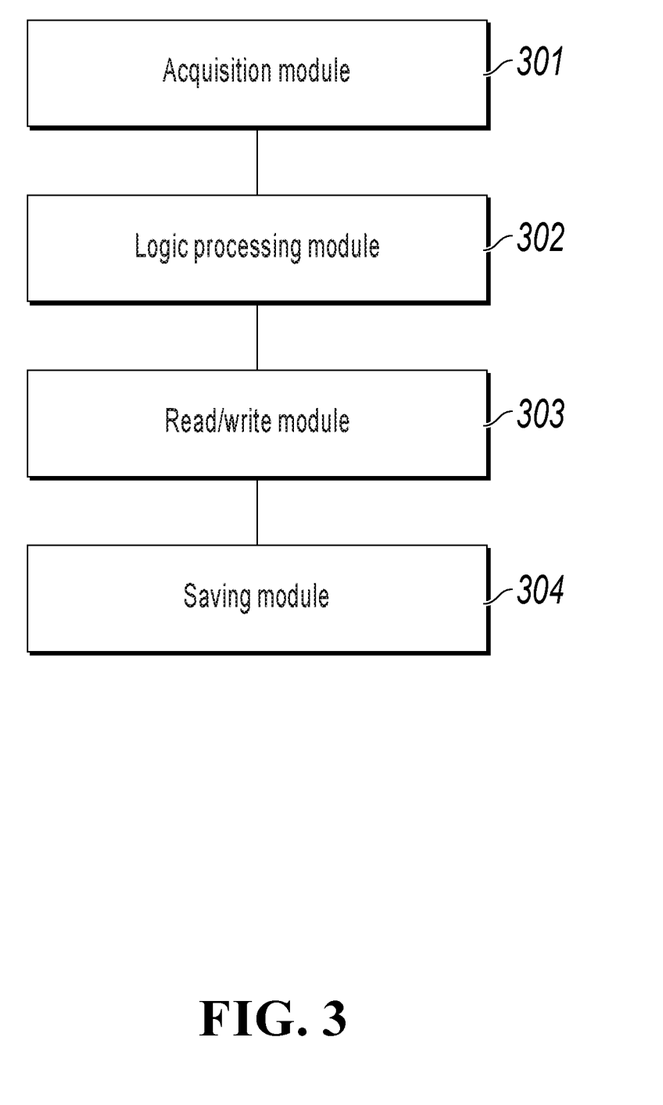
FIG. 3 is a schematic structural diagram illustrating a device for concealing user information contained in an application, according to Implementation 3 of the present application.

The previous description provides the method for concealing user information contained in an application in the implementation of the present application. Based on the same idea, Implementation 3 of the present application further provides a device for concealing user information contained in an application. FIG. 3 shows a structure of the device for concealing user information contained in an application, according to Implementation 3 of the present application. The device includes the following: an acquisition module 301, configured to obtain operation rights to an attribute list of a media file in an application; a logic processing module 302, configured to perform logic processing on user information generated in the application; a read/write module 303, configured to read the attribute list of the media file in the application and write the user information generated in the application or user information that undergoes logic processing into the attribute list of the media file; and a saving module 304, configured to re-save the media file.

It is worthwhile to note that the previous attribute list includes attribute information used to describe the media file. The user information is sensitive and confidential information, and the previous media file includes a photo file, an audio file, and a video file. In addition, the previous user information can alternatively be pre-encrypted user information.

Performing logic processing on the user information generated in the application is reversible logic processing, for example, the logic processing can be symmetric encryption.

In conclusion, according to the method and the device for concealing user information contained in an application provided in the implementations of the present application, user information generated in an application is written into an attribute list of a media file in the application. As such, the user information is concealed and can hardly be found and obtained in a local folder of a mobile device, and the user information generated in the application is prevented from being disclosed.

In the 1990s, whether a technology improvement is hardware improvement (for example, improvement of a circuit structure, such as a diode, a transistor, or a switch) or software improvement (improvement of a method procedure) can be obviously distinguished. However, as technologies develop, the current improvement for many method procedures can be considered as direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip 2. In addition, the programming is mostly implemented by using "logic compiler" software instead of manually making an integrated circuit chip. It is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented in any appropriate way. For example, the controller can be a microprocessor, a processor, or a computer readable medium, a logic gate, a switch, an application-specific integrated circuit (ASIC), a programmable logic controller, or an embedded microcontroller that stores computer readable program code (for example, software or firmware) that can be executed by the processor (or the microprocessor). Examples of the controller include but are not limited to the following microcontrollers: ARC 625D, Atmel AT91SAM, Microchip PIC18F26K20, or Silicon Labs C8051F320. A memory controller can also be implemented as a part of control logic of the memory. A person skilled in the art also knows that a controller can be implemented using pure computer readable program code, and the steps in the method can be logically programmed to enable the controller to implement same functions in forms of a logical gate, a switch, an application-specific integrated circuit, a programmable logic controller, an embedded microcontroller, etc. Therefore, the controller can be considered as a hardware component, and a device configured to implement various functions in the controller can also be considered as a structure in a hardware component. Alternatively, a device configured to implement various functions can be considered as a software module that can implement the method or a structure in a hardware component.

The system, device, module, or unit illustrated in the previous implementations can be implemented by using a computer chip or an entity, or can be implemented by using a product having a certain function.

For ease of description, the described device is described by dividing functions into various units. Certainly, when the present application is implemented, the functions of each unit can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product implemented on one or more computer-usable storage media (including but not limited to a magnetic disk memory, a CD-ROM, and an optical memory) that include computer-usable program code.

The present disclosure is described with reference to the flowcharts and/or block diagrams of the method, the device (system), and the computer program product based on the implementations of the present disclosure. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine. As such, the instructions are executed by the computer or the processor of another programmable data processing device to generate a device for implementing a specified function in one or more procedures in the flowcharts and/or in one or more blocks in the block diagrams.

These computer program instructions can be stored in a computer readable memory that can instruct the computer or another programmable data processing device to work in a particular way. As such, the instructions stored in the computer readable memory generate an artifact that includes an instruction device. The instruction device implements a particular function in one or more procedures in the flowcharts and/or in one or more blocks in the block diagrams.

These computer program instructions can be loaded to a computer or another programmable data processing device so that a series of operations and steps are performed on the computer or another programmable device to generate computer-implemented processing. Therefore, the instructions executed on the computer or another programmable device provide steps for implementing a specified function in one or more procedures in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), and/or a nonvolatile memory, etc. in a computer readable medium, such as a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change random access memory (PRAM), a static RAM (SRAM), a dynamic RAM (DRAM), a RAM of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by a computing device. As described in the present specification, the computer readable medium does not include transitory media, for example, a modulated data signal and a carrier.

It is worthwhile to further note that, the term "include", "contain", or any other variant is intended to cover non-exclusive inclusion so that a process, a method, a product, or a device that includes a series of elements not only includes these elements, but also includes other elements that are not expressly listed, or further includes elements inherent to such a process, method, product, or device. An element preceded by "includes a . . . " does not, without more constraints, exclude the existence of additional identical elements in the process, method, product, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product implemented on one or more computer-usable storage media (including but not limited to a magnetic disk memory, a CD-ROM, and an optical memory) that include computer-usable program code.

The present application can be described in common contexts of computer executable instructions executed by a computer, such as a program module. Generally, the program module includes a routine, a program, an object, a component, a data structure, etc. executing a specific task or implementing a specific abstract data type. The present application can also be practiced in distributed computing environments. In these distributed computing environments, tasks are executed by remote processing devices that are connected by using a communications network. In the distributed computing environments, the program module can be located in local and remote computer storage media that include storage devices.

The implementations in the present specification are described in a progressive way. For same or similar parts in the implementations, references can be made to the implementations. Each implementation focuses on a difference from other implementations. Particularly, a system implementation is similar to a method implementation, and therefore, is described briefly. For related parts, references can be made to related descriptions in the method implementation.

The previous descriptions are merely implementations of the present application, and are not intended to limit the present application. A person skilled in the art can make various modifications and changes to the present application. Any modifications, equivalent replacements, improvements, etc. made within the spirit and principle of the present application shall fall within the protection scope of the claims of the present application.

Figure 4:
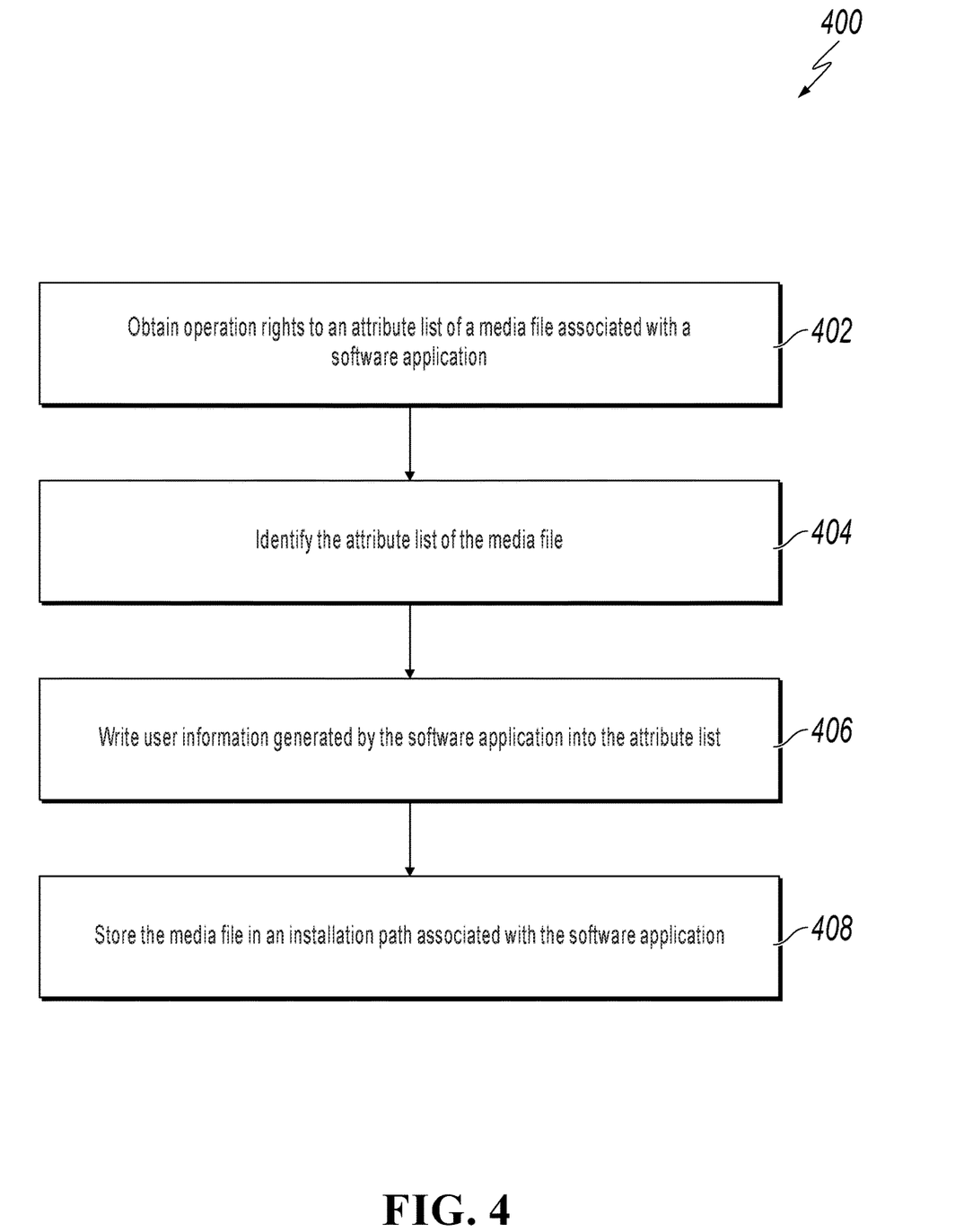
FIG. 4 is a flowchart illustrating an example of a computer-implemented method for concealing sensitive or confidential information in an application, according to an implementation of the present disclosure.

FIG. 4 is a flowchart illustrating an example of a computer-implemented method 400 for concealing sensitive or confidential information, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, operation rights are obtained to an attribute list of a media file associated with a software application. In some implementations, the operation rights can include, but is not limited to, a file handle and a read/write permission for the attribute list. From 402, method 400 proceeds to 404.

At 404, the attribute list of the media file is identified. In some cases, after identifying the attribute list of the media file, user information that undergoes logic processing by the software application is written into the attribute list. In some implementations, performing the logic processing on the user information includes performing reversible logic processing and symmetric encryption processing on the user information, where the symmetric encryption processing uses a symmetric encryption algorithm. From 404, method 400 proceeds to 406.

At 406, user information generated by the software application is written into the attribute list. In some implementations, the user information can include, but is not limited to, sensitive and confidential information. Further, the user information can be encrypted. In some implementations, the user information generated by the software application is written into the attribute list in a key-value pair format. From 406, method 400 proceeds to 408.

At 408, the media file is stored in an installation path associated with the software application. The media file can include, but is not limited to, a photo file, audio file, or video file. After 408, method 400 can stop.

Implementations of the subject matter described in this specification can be implemented so as to realize particular advantages or technical effects. For example, implementations of the subject matter decrease the probability of malicious user finding the encrypted information to obtain sensitive and confidential information. The described methodology permits enhancement of security of sensitivity or confidential information by encrypting and processing the user information before storing the media file back in the installation path of the application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same.

Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   obtaining operation rights to an attribute list of a media file in a software application, including obtaining a file handle of the media file and obtaining read or write permission for the attribute list of the media file;
   identifying the attribute list of the media file, the attribute list including attribute information that describes the media file;
   writing user information that has been generated during execution of the software application into the attribute list of the media file in a key-value pair format; and
   storing the media file in an installation path of the software application.

2. The computer-implemented method of claim 1, wherein the user information comprises sensitive and confidential information, wherein the user information is encrypted.

3. The computer-implemented method of claim 1, wherein the media file comprises a photo file, an audio file, or a video file.

4. The computer-implemented method of claim 1, further comprising writing user information that undergoes logic processing by the software application into the attribute list.

5. The computer-implemented method of claim 4, wherein performing logic processing on user information generated by the software application comprises:
   performing reversible logic processing on the user information; and
   performing symmetric encryption processing on the user information by using a symmetric encryption algorithm.

6. A non-transitory, computer-readable medium storing one or more instructions executable by a computer system to perform operations comprising:
   obtaining operation rights to an attribute list of a media file in a software application, including obtaining a file handle of the media file and obtaining read or write permission for the attribute list of the media file;
   identifying the attribute list of the media file, the attribute list including attribute information that describes the media file;
   writing user information that has been generated during execution of the software application into the attribute list of the media file in a key-value pair format; and
   storing the media file in an installation path of the software application.

7. The non-transitory, computer-readable medium of claim 6, wherein the user information comprises sensitive and confidential information, wherein the user information is encrypted.

8. The non-transitory, computer-readable medium of claim 6, wherein the media file comprises a photo file, an audio file, or a video file.

9. The non-transitory, computer-readable medium of claim 6, further comprising one or more instructions to write user information that undergoes logic processing by the software application into the attribute list.

10. The non-transitory, computer-readable medium of claim 9, wherein performing logic processing on user information generated by the software application comprises one or more instructions to:
    perform reversible logic processing on the user information; and
    perform symmetric encryption processing on the user information by using a symmetric encryption algorithm.

11. A computer-implemented
system, comprising: one or more computers; and
one or more computer memory devices interoperably coupled with the one or more computers and having tangible, non-transitory, machine-readable media storing one or more instructions that, when executed by the one or more computers, perform one or more operations comprising:
   obtaining operation rights to an attribute list of a media file in a software application, including obtaining a file handle of the media file and obtaining read or write permission for the attribute list of the media file;
   identifying the attribute list of the media file, the attribute list including attribute information that describes the media file;
   writing user information that has been generated during execution of the software application into the attribute list of the media file in a key-value pair format; and
   storing the media file in an installation path of the software application.

12. The computer-implemented system of claim 11, wherein the user information comprises sensitive and confidential information, wherein the user information is encrypted.

13. The computer-implemented system of claim 11, wherein the media file comprises a photo file, an audio file, or a video file.

14. The computer-implemented system of claim 11, further comprising writing user information that undergoes logic processing by the software application into the attribute list, wherein performing logic processing on user information generated by the software application comprises one or more operations to:

perform reversible logic processing on the user information; and perform symmetric encryption processing on the user information by using a symmetric encryption algorithm.

* * * * *